UNITED STATES PATENT OFFICE.

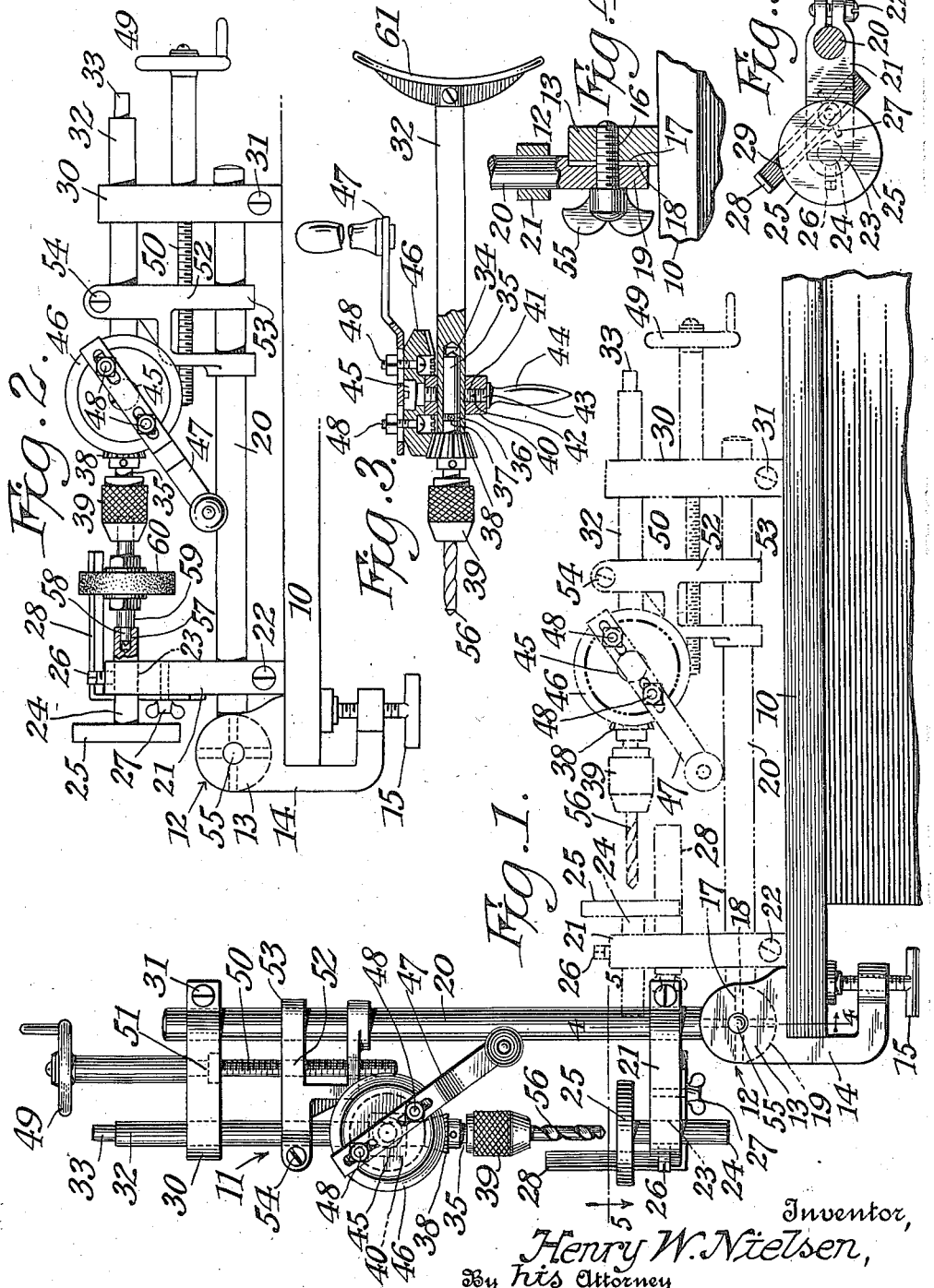

HENRY W. NIELSEN, OF BROOKLYN, NEW YORK.

CONVERTIBLE DRILL AND GRINDER.

1,296,004.   Specification of Letters Patent.   Patented Mar. 4, 1919.

Application filed February 20, 1918. Serial No. 218,335.

*To all whom it may concern:*

Be it known that I, HENRY W. NIELSEN, a citizen of Denmark, residing at Brooklyn, Kings county, New York, have invented certain new and useful Improvements in Convertible Drills and Grinders, of which the following is a specification.

This invention relates to tools, the object being to provide a convertible drill and grinder, of new and novel construction, in which the structural elements are susceptible to various conditions of use, are interchangeable and of such character that the tool may be assembled and adapted for use as an ordinary vertical drill, a horizontal drill, a breast drill or a grinder or tool sharpener as desired.

Various advantages inherent to my invention, both in structure and function, other than those above enumerated, will appear from the hereinafter detailed description.

In the accompanying drawings I have illustrated different practical adaptations of the invention, but those shown therein are to be understood as illustrative only, and not as defining the limits of the invention, and in which drawings:—

Figure 1. is a side elevation showing my improved tool attached to a table or other support and indicating, in dotted lines, a different position in which it may be used.

Fig. 2. is a side view, partly in section, showing the parts as assembled when the tool is to be used as a grinder or tool sharpener.

Fig. 3. is a side view, partly in section, showing the tool assembled for use as a breast drill.

Fig. 4. is a detail section taken on line 4—4 of Fig. 1.

Fig. 5. is a horizontal section taken on line 5—5 of Fig. 1.

Referring to the drawings I show at 10, a suitable table or support, to which is clamped or secured my improved tool 11, having an adjustable clutch 12, constituted by a semi-circular head 13, formed integral with an angled arm 14, carrying, in threaded engagement, a clamping screw 15. The head 13, is provided with a central threaded aperture 16, and radially arranged grooves 17, to receive corresponding radial ribs 18, carried by a disk 19, formed with a supporting bar 20.

In carrying out my invention, I provide a table supporting bracket 21, split at one end and threaded to receive a screw 22, by which it is made fast to the bar 20; the bracket 21, at the other end, has a bore 23, to receive the shank 24, of a work supporting table 25, which is held at a desired elevation by a binding screw 26, and secured to the bottom of the bracket 21, by a wing screw 27, is an angled rest or stop piece 28, having one of its arms slotted as at 29, as shown in Fig. 5.

A guide bracket 30, is clamped as at 31, to the bar 20, at the top, and serves to guide a chuck bar 32, having a reduced portion 33, at one end and a counterbore or socket 34, at the other, adapted to receive a shank 35, grooved as at 36, to receive a pin or screw 37, to rotatably retain the shank in the counterbore or socket 34. A beveled gear 38, is made fast to the shank 35, which also carries a chuck 39.

A block 40, is fixed to the chuck bar 32, by a short screw 41, threaded in a bore 42, said socket being deep enough to accommodate the threaded shank 43, of a handle 44, when the tool is to be used as a breast drill, as shown in Fig. 3. In the block, opposite the handle 44, is threaded a screw 45, on which is revolubly carried a gear 46, meshing with gear 38, and carrying in adjustable relation an operating handle 47, slotted to receive screws 48.

A feed handle 49, is carried on a feed screw 50, swiveled at 51, in the guide bracket 30, said screw 50, having threaded engagement at 52, with a feed bracket 53, slidable on the supporting bar 20, and clamped by screw 54, to the chuck bar 32.

Parts 13, and 19, are clamped in positive fixed relation by a wing screw 55.

In Figs. 1 and 3, the chuck 39, carries a drill 56, but when, as in Fig. 2, the tool is to be used as a grinder or tool sharpener, it is necessary to reverse the shank 24, in the bracket 21, said shank being provided with a bearing socket 57, adapted to receive a reduced bearing 58, provided on the spindle 59, of an emery or other grinding wheel 60, the opposite end of said spindle being clamped in the chuck 39, as clearly shown.

When adapting the parts for use as a breast drill, the chuck bar 32, and its associated parts, are removed from brackets 30, and 53, and a breast plate 61, clamped on the reduced portion 33, thereof, as shown in Fig. 3.

It is thought that the operation and utility of the tool will be apparent to those skilled in the art without further description, and it will be apparent that various structural modifications are possible within the scope of the invention claimed.

What I claim is:—

A tool comprising a supporting bar, a clutch member formed integral therewith and having radial ribs and a central aperture, a clamp having a companion clutch member carrying corresponding radial ribs, a bracket adjustable on said bar, a work table and an angular stop piece both adjustably supported by the bracket, said table having a shank provided with a socket adapted, when said table is reversed in its bracket, to support a grinding device, a guide bracket clamped to the supporting bar at the top thereof, a feed bracket slidable on said supporting bar, a chuck bar clamped in the feed bracket and slidable in the guide bracket and having a reduced end adapted to receive a breast plate, a chuck swiveled on said chuck bar, means for driving the chuck and, means for feeding the same.

In testimony whereof, I have signed my name to this specification this 15th day of February, 1918.

HENRY W. NIELSEN.